Oct. 11, 1960   C. W. DE WALT, JR., ET AL   2,956,065
METHOD FOR PRODUCING PHENANTHRAQUINONE
Filed May 16, 1958
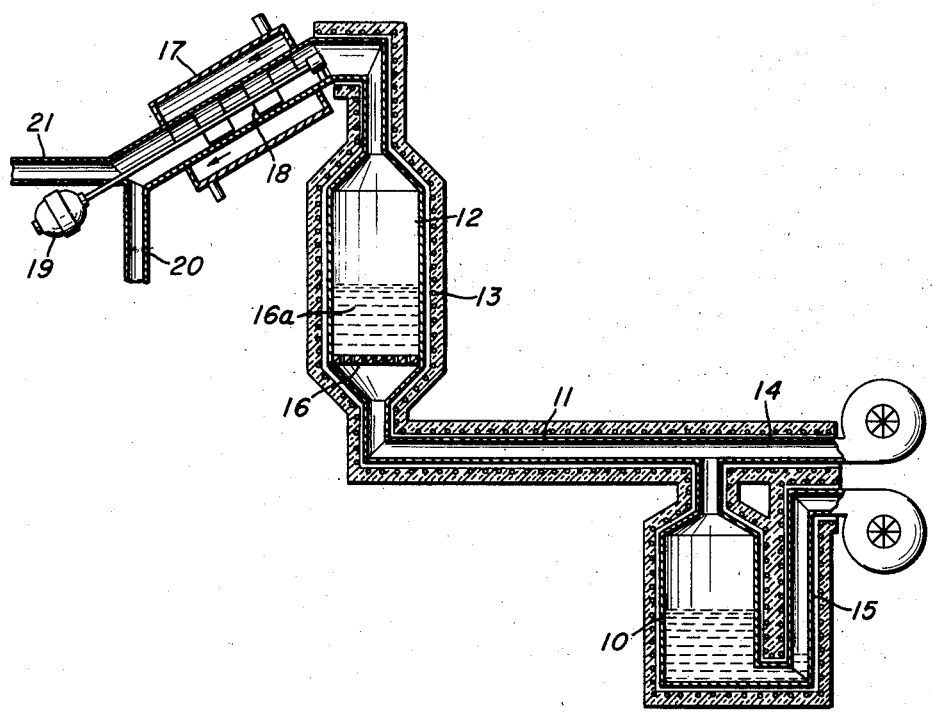
INVENTORS:
CURTIS W. DEWALT, JR. and
KENNETH A. SCHOWALTER,
BY: Donald G. Dalton
their Attorney.

United States Patent Office 2,956,065
Patented Oct. 11, 1960

2,956,065
METHOD FOR PRODUCING PHENANTHRA-
QUINONE

Curtis W. De Walt, Jr., Wilkins Township, Allegheny County, and Kenneth A. Schowalter, Verona, Pa., assignors to United States Steel Corporation, a corporation of New Jersey Filed May 16, 1958, Ser. No. 735,728

1 Claim. (Cl. 260—396)

This invention relates to a method for the oxidation of phenanthrene to produce phenanthraquinone and, in particular, to a vapor-phase catalytic reaction giving a high yield.

This is in part a continuation of our application, Serial No. 477,788, filed December 27, 1954, now abandoned.

The quinones form a useful group of compounds but, for practical purposes, are limited to benzoquinone, naphthoquinone and anthraquinone. Phenanthraquinone has been produced experimentally but the yield from known processes is so low or the cost so high that the product is not available commercially. Phenanthrene is produced in considerable quantities in by-product coke plants, and a simple efficient process for converting it to the quinone would increase the market therefor. This is the object of our invention. Our process is more efficient and economical than those known heretofore, making the compound available at lower cost and hence broadening its utility in the chemical industry.

The catalytic oxidation of phenanthrene to the quinone in a vapor-phase reaction is not difficult. The problem is to prevent further oxidation of the quinone to undesired end products thereby reducing the yield to very low values. We have discovered a method using a catalyst of proper composition which causes oxidation of phenanthrene to the quinone but does not cause further oxidation of the product to an excessive degree so that the yield remains high, i.e., in the neighborhood of 50% of the maximum theoretically obtainable.

Generally speaking, our invention utilizes a highly inhibited catalyst consisting of vanadia in a silica bed, along with an inhibiting material in an amount greater than that of the vanadia or the silica. By reason of the inhibited action of the catalyst, it is possible therewith to obtain from the tricyclic aromatic compound good yields of quinone without substantial further oxidation of the latter to carboxylic acids and finally to carbon dioxide and water. As the inhibiting agent, we prefer to use potassium sulphate in a limited range of ratios by weight, in respect to the amount of silica, i.e., 1.5 to 4.

A complete understanding of our invention may be obtained from the following detailed description and explanation thereof which refer to the accompanying drawing, the single figure of which illustrates diagrammatically the preferred practice and the apparatus necessary to carry it out.

Referring now in detail to the drawing, a boiler or vaporizer 10 having suitable provision for heating such as a steam jacket or electric-resistance coil, holds a charge of a tricyclic aromatic compound such as phenanthrene. Vapor evolved from the charge flows along a heated pipe 11 to a heated reaction chamber 12 provided with heating means 13. Air or oxygen is mixed with the vapor, being added through a heated connection 14 to pipe 11 from a storage tank or blower. Air or oxygen is also admitted to the boiler 10 below the charge through a heated connection 15.

Chamber 12 has a perforated or reticulated grate 16 adjacent to the bottom thereof supporting a bed 16a of catalyst. The grate may, however, be omitted. Phenanthrene vapor and oxygen passing through the bed fluidize the latter and combine to form phenanthraquinone, the vapor of which condenses in a condenser 17 connected to the chamber. A rotary scraper 18 driven by a motor 19 removes the solid collecting on the interior of the condenser whereupon it falls through a pipe 20 to a receiving container. Unreacted gases flow through an outlet 21 to a filter (not shown).

The catalyst is in granular form and consists of vanadia distributed in a mass of silica, inhibited by the presence of potassium sulphate. The catalyst is so made that the final composition is preferably about 10% vanadia, 23% silica and 67% potassium sulphate, by weight. The vanadia content may, however range between 5 and 15%. The sulphate is the predominating ingredient and should be from 1.5 to 4 times the amount of silica. Stated in tabular form, the catalyst composition may be as follows (percentages by weight):

|  | Percent |
| --- | --- |
| Vanadia | 5–15 |
| Silica | 17–38 |
| Potassium sulphate | 51–76 |

In order to assure effective oxidation of phenanthrene, a large excess of air should be supplied, i.e., air should be supplied at a rate sufficient to furnish from 500 to 1000 atoms of oxygen per molecule of phenanthrene. This is equivalent to from 90 to 180 lbs. of oxygen per lb. of phenanthrene. To aid the reaction, the temperature in chamber 12 is maintained at from 300 to 500° F. The velocity of phenanthrene vapor and air through the catalyst bed should be such as to afford a period of contact between .02 and .2 sec., preferably about .05 sec. A time shorter than .02 sec. is insufficient to permit the oxidation necessary to give a maximum yield while a time longer than .2 sec. permits the oxidation of product phenanthraquinone mentioned above with a reduction in yield.

Further details of our procedure will be readily understood from the following typical examples:

EXAMPLE I

Phenanthrene (99.5% purity) was vaporized at the rate of 0.4629 g./hr., mixed with 144 liters of air (at room temperature) per hour, the mixture heated to 400° C., and passed through a fluidized bed of 4 ml. of a catalyst ground to a particle size of from 60 to 100 mesh and composed of vanadia, 14 parts, silica, 26 parts, and potassium sulphate, 60 parts, by weight, at 400° C. The contact time was 0.05 second and the oxygen supply, 1000 cubic feet (at room temperature) per pound of phenanthrene. A 37% conversion of phenanthrene to phenanthraquinone was obtained. Of the phenanthrene vaporized, 25% was recovered unchanged in solid form when condensed along with the phenanthraquinone so that the theoretical yield of the latter was 49% based on the amount of phenanthrene reacted.

EXAMPLE II

Phenanthrene (90%) was vaporized at the rate of 0.4772 g./hr., mixed with 144 liters of air (at room temperature) per hour, the mixture heated to 400° C., and passed through a fluidized bed of 4 ml. of a catalyst in a particle size range as given above and composed of vanadia, 14 parts, silica, 26 parts, and potassium sulphate, 60 parts, at 400° C. The contact time was 0.05 second and the oxygen supply, 1000 cubic feet per pound of phenanthrene. A 34% conversion of phenanthrene to phenanthraquinone was obtained. Of the phenanthrene vaporized, 26% was recovered unchanged, so that the theoretical yield of phenanthraquinone was 46% based on the amount of phenanthrene reacted.

EXAMPLE III

Phenanthrene (pure, M.P. 98–100° C., see Example I above) was vaporized at the rate of 0.4190 g./hr., mixed with 144 liters of air (at room temperature) per hour, the mixture heated to 380° C., and passed through a fluidized bed of 4 ml. of a catalyst in particle form as before and composed of vanadia, 10 parts, silica, 22 parts and potassium sulphate, 68 parts, at 380° C. The contact time was 0.05 second and the oxygen supply, 1150 cubic feet per pound of phenanthrene. A 38% conversion of phenanthrene to phenanthraquinone was obtained. Of the phenanthrene vaporized, 21% was recovered unchanged, so that the theoretical yield of phenanthraquinone was 48% based on the amount of phenanthrene reacted.

The invention may be similarly applied to the oxidation of anthracene to anthraquinone and of fluorene to fluorenone. Table A below gives, in column 1, the significant data relating to Example III and, in columns 2 and 3, similar data for typical runs of anthracene and fluorene, respectively:

Table A

| | Phenanthrene Phenanthraquinone | Anthracene Anthraquinone | Fluorene Fluorenone |
|---|---|---|---|
| Starting Material Product | | | |
| Source of Specific Data | Example III | Example IV | Example V |
| Catalyst Composition: | | | |
| a. Percent $K_2SO_4$ | 68 | 60 | 60. |
| b. Percent $SiO_2$ | 22 | 26 | 26. |
| c. Percent $V_2O_5$ | 10 | 14 | 14. |
| Oxygen supply in atoms per molecule of starting material | 570 | 300 | 1,160. |
| Oxygen supply in lb. per lb. of starting material | 103 | 54 | 198. |
| Oxygen supply in s.c.f. per lb. of starting material | 1,150 | 600 | 2,200. |
| Temperature | 400° C | 400° C | 400° C. |
| Contact Time [1] | 0.05 sec | 0.05 sec | 0.05 sec. |
| Yield [2] | 48% | 92% | 73%.[3] |
| Vaporization Rate | 0.4190 g./hr. | 1.4 g./hr. | 0.384 g./hr. |
| Catalyst Volume | 4 ml | 4 ml | 4 ml. |
| Gas Used | Air | Air | Air. |
| Permissible range of oxygen supply | 500 to 1,000 atoms per molecule. 90 to 180 lb. per lb. 1,000 to 2,000 s.c.f. per lb. | 50 to 400 9 to 72 18 to 145 | 900 to 1,700. 154 to 291. 333 to 630. |
| Permissible range of temperature | 300 to 500° C | 300 to 500° C | 300 to 500° C. |
| Permissible range of contact time [1] | 0.02 to 0.2 sec | 0.01 to 0.2 sec | 0.02 to 0.2 sec. |

[1] The contact times are superficial contact times calculated at reaction temperature. If desired, the contact times may be converted to the basis of room temperature, since such figures are more commonly so reported.
[2] Yields are corrected for unreacted starting material recovered from oxidation products.
[3] 30% of starting material recovered unreacted in the specific example.

It will be apparent from the foregoing that our method and catalyst are simple and inexpensive yet provide a good yield. We are thus enabled to produce the quinones or ketones commercially, thereby increasing the possible utilization of available supplies of phenanthrene.

Although we have disclosed herein several examples of the preferred practice and catalyst composition, it is our intention to cover as well such variations thereof as fall within the scope of the appended claim.

We claim:

A method of making phenanthraquinone which consists in mixing oxygen with phenanthrene vapor, bringing the mixture into contact with a catalyst in granular form at a temperature of from 300 to 500° C., said catalyst consisting essentially of from 5 to 15% vanadia and the balance being silica and potassium sulphate, the amount of the sulphate being from 1.5 to 4 times the amount of silica, and continuing the contact for from .02 to .2 second.

References Cited in the file of this patent

UNITED STATES PATENTS

| 1,764,023 | Jaeger | June 17, 1930 |
| 2,769,018 | West | Oct. 30, 1956 |